July 3, 1962  S. L. BOERSMA  3,042,805
LIGHT MEASURING APPARATUS
Filed April 18, 1960
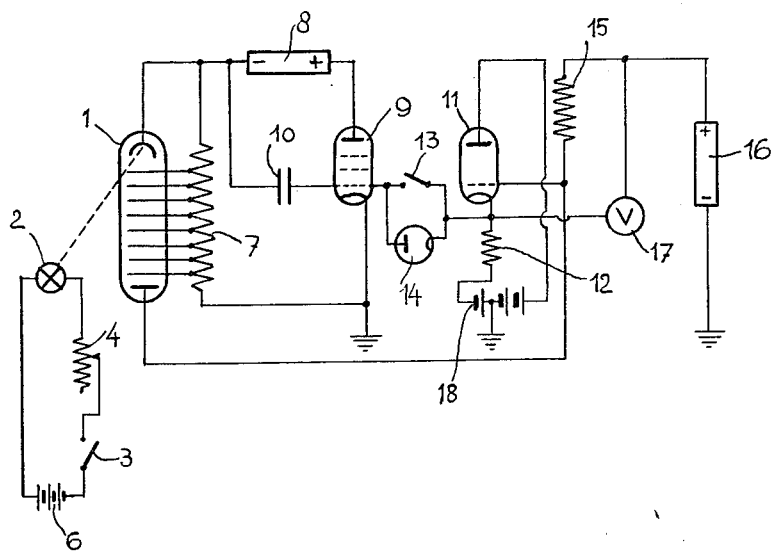
INVENTOR.
SIPKO LUU BOERSMA
BY
Wenderoth, Lind & Ponack
Attys.

3,042,805
LIGHT MEASURING APPARATUS
Sipko Luu Boersma, Delft, Netherlands, assignor to N.V.
Optische Industrie de Oude Delft, Delft, Netherlands
Filed Apr. 18, 1960, Ser. No. 23,022
Claims priority, application Netherlands Apr. 22, 1959
4 Claims. (Cl. 250—207)

The invention relates to light measuring apparatus, employing a photoelectric cell. Devices of that type are well-known in many different forms.

In some instances, such as e.g. in X-ray photofluorography, the light flux to be measured is very small (e.g. $10^{-3}$ to $10^{-7}$ lumens). As is well-known in X-ray photofluorography light measuring devices are often used which employ a photoelectric cell arranged in the camera hood opposite the fluorescent screen so as to determine the time interval during which the X-ray tube must be energized in order to obtain a picture that is correctly exposed.

To measure such small light fluxes very sensitive photoelectric cells are available such as the photomultiplier tube with secondary electron amplification and, more recently, the photo-resistor made of pressed calcium-sulfide. The sensitivity of such photocells is in the order of 1 to 100 amperes per lumen.

A well-known drawback of these modern high-sensitivity photocells is however that the sensitivity of individual cells taken from a series may differ to a large extent and the sensitivity of a particular cell may show large variations in the course of time due to various influences, such as aging, temperature variations and the like.

This spreading in sensitivity in the case of photomultiplier tubes, is due to slight variations in the emission of the photocathode and the multiplication factor per dynode. As the total gain of a tube having $n$ dynodes is equal to the $n^{th}$ power of the multiplication factor per stage such slight variations may have a large influence. In practice sensitivities differing by a factor 50 have been noted in tubes of one and the same type and make. The CdS-cells mainly suffer from a highly expressed temperature influence on sensitivity. This spreading in sensitivity in many cases necessitates frequent re-adjustments of the measuring device and makes changing of the photocell in case of failure difficult.

It has been proposed to stabilize light measuring apparatus employing a photomultiplier tube by means of a feedback between the anode and a more forward part of the tube. According to one particular proposal a separate part of the photocathode surface of the photomultiplier tube is continuously irradiated by a reference light source and the anode consists of two parts, which are isolated relative to each other, and may be termed measuring anode and control anode, respectively. The purpose of this arrangement is to provide for two separate electron currents flowing through the tube of which one represents the light flux to be measured and the other serves only the purpose of tube stabilization. To this end the latter current is fed back to one or more of the dynodes so as to maintain the control anode current practically constant. In addition to the risk that cross-talk occurs between the measuring current and the control current, this prior art device has the drawback that the emission characteristics of the photocathode and the dynodes may not be constant throughout their surfaces to a satisfactory degree. Moreover, the tube is difficult in manufacture and has large dimensions.

According to another prior proposal the device employs a feedback circuit between the anode and one or more of the dynodes which includes a detector capable of distinguishing between fast negative fluctuations of the anode current and slow positive or negative changes. Only the fast negative fluctuations represent light signals to be measured whereas the slower fluctuations are supposed to be due to undesired changes in tube sensitivity or in background brightness. After detection, only the latter fluctuations are allowed to influence the potentials of the tube dynodes. It will be evident that this device is intended for very specific applications to wit the optical scanning of continuously moving films on which very short energy pulses such as are produced by nuclear events are recorded as narrow black dots.

The invention has for its principal object to provide a light measuring apparatus adapted for more general use and which essentially avoids the above listed drawbacks.

According to the invention in a light measuring device employing a photocell a reference light source is provided which irradiates the photocell during standardization intervals in which the means controlling the sensitivity of the device are readjusted if necessary whereas the adjustment of such means is substantially maintained constant during measuring intervals between such standardization intervals.

In the invention, accordingly, the sensitivity of the photocell arrangement is periodically adjusted to a standard value. This is accomplished during intervals in which no measurement is made or in which measuring is purposely stopped to this end. This will rarely be inconvenient since the standardization intervals may be very short and a continuous measurement of the light flux during so long a time interval that a substantial change in sensitivity must be expected, will be very seldom required.

The means readjusting the sensitivity of the device during the standardization interval may be of various forms. It may be constituted e.g. by a diaphragm which is positioned in the path of the light to be measured and can be actuated by a servo-mechanism. If a CdS-cell is used the cell voltage can be varied to control the effective sensitivity.

If the photocell is a photomultiplier it will be preferable, according to the invention, to provide a supply circuit for the photomultiplier whose output voltage is stabilized and which includes a condenser as a source of reference voltage, the voltage of the condenser being controlled by the difference between the output signal of the photomultiplier and the reference signal.

A preferred embodiment of the light measuring device according to the present invention will now be described in detail, reference being had to the annexed drawing in which 1 designates a photomultiplier tube which, during the standardization intervals, receives light emitted by a reference light source 2. The latter light source is an electric lamp which is supplied with current from a battery 6 via a switch 3 and a rheostat 4. The amount of light which is thrown by the light source 2 onto the photocathode of tube 1 may be varied by means of the rheostat 4 for a purpose further to be specified below.

The dynodes of the photomultiplier tube 1 are connected to the tappings of a potentiometer 7 between the photocathode and earth. A source of high tension power 8 is connected in series with a control tube 9. This is a pentode whose control grid is connected to the cathode of a cathode follower tube 11. A condenser 10 which preferably has small a leakage resistance as possible, is connected between the control grid of tube 9 and the photocathode of tube 1. The anode of the cathode follower 11 receives a positive potential of e.g. 200 volts and the cathode is connected through a series resistor 12 to a negative potential of e.g. 100 volts. The control grid of the cathode follower 11 is connected to the anode of the photomultiplier. A switch 13 permits to disconnect the cathode follower from the control grid of control tube 9.

The switch 13 is coupled to switch 3 in the supply circuit of light source 2 such that both switches are closed and opened synchronously. A diode 14 is connected in parallel to the switch 6 and constitutes a protection against over-exposure of the photomultiplier tube when the switch is open.

The anode of the photomultiplier tube 1 is connected through a load resistor 15 to a constant voltage source 16 having a reference voltage of e.g. 85 volts. The reference voltage may be adjustable as desired.

The device functions as follows: During the standardization interval the switches 3 and 13 are closed and the reference light source 2 throws a well-defined light flux onto the photocathode of the photomultiplier 1. The light flux to be measured does not exist during this period or may be blocked by a suitable screen.

The photomultiplier if adjusted to the desired sensitivity will now produce a current in the anode load resistor 15 of a magnitude such that the potential drop across this resistor will be 85 volts approximately, the control grid of the cathode follower 11 being substantially at earth potential. If it is supposed, however, that the photomultiplier produces too small a current, in other words, if the sensitivity of the device is too low, then the voltage across the resistor 15 is lower than 85 volts. Through the cathode follower 11 and the switch 13 a positive voltage is produced at the control grid of tube 9 which makes the latter tube strongly conductive. Consequently, a high voltage is produced between the cathode of the photomultiplier and earth. The latter volage is the supply voltage of the dynode cascade of the photomultiplier; any rise of this voltage leads to a higher multiplication factor and a higher current in the anode circuit of the photomultiplier. The latter current increases until the potential drop across anode resistor 15 slightly exceeds the reference voltage of voltage source 16. For, at this occasion, the control grid of cathode follower 11 and at the same time the control grid of control tube 9 has become slightly negative relative to earth whereby tube 9 is less conductive and the voltage across the potentiometer 7 is low. An equilibrium is developed wherein the latter voltage which is the supply voltage of the dynode cascade, and the multiplication factor of the multiplier have such values that the reference light source 2 produces a voltage drop across the anode resistor which slightly exceeds 85 volts.

The adjustment described may be completed in a relatively short time interval. In fact the speed of response is determined by the magnitude of the charging current which can flow into the condenser 4. The cathode follower 11 in this respect actually functions as a current amplifier. Anyhow, in practical forms of the illustrated circuit the standardization period may safely be terminated after a period of e.g. 10 or 100 msec. by opening the switches 3 and 13.

The right hand plate of the condenser 10 is then isolated and, dependent on the leakage resistance of the condenser, the latter will maintain practically its full charge for a certain period of e.g. 15 minutes. During this interval the device can be used for measuring purposes, the standard sensitivity of the photomultiplier which has been adjusted during the previous standardization interval being maintained, irrespective of variations of the tension of high voltage source 8. The circuit formed by the voltage source 8, the control tube 9 and the condenser 10 now works as a stabilized high tension supply of a type known per se in the art, the voltage across the condenser 10 acting as a reference voltage. If e.g. due to a variation in the mains voltage the tension of voltage source 8 is slightly decreased whereby the cathode of the photomultiplier becomes more positive, the control grid of tube 9 becomes slightly less negative. Then, tube 9 becomes more conductive and the anode of this tube less positive whereby the equilibrium is restored.

The voltage across the dynode cascade of the photomultiplier maintains the value given to it during the standardization interval as long as condenser 10 remains fully charged. The anode current of the photomultiplier can now be used in any manner known per se for measuring or control purposes. In the drawing a voltmeter 17 is shown connected between the cathode of the cathode follower tube 11 and the connection point of anode resistor 15 and reference voltage supply 16. This voltmeter indicates the approximate voltage across the load resistor 15 which is indicative of the light flux impinging on the photo-cathode of the photomultiplier. In the measuring intervals, as was the case during the standardization intervals, the cathode follower 11 functions as a current amplifier. If it is desired to use the device as a timing switch for X-ray photofluorography an integrating circuit may be substituted for the voltmeter 17, which circuit automatically switches off the X-ray tube when a certain voltage has been reached. The simplest integrating arrangement possible is obtained by permitting the anode current of the photomultiplier tube to directly charge an integrating condenser.

Thus, in order to maintain constant the calibration of the device (e.g. the reading of voltmeter 17 against lumens of the light flux incident on the photocathode) the switches 3 and 13 must be closed, in a practical case, for e.g. .1 second each quarter of an hour. In an X-ray photofluorographic camera it will be preferred, however, to couple the switches 3 and 13 to the operating mechanism of the X-ray tube and the camera so as to repeat the standardization of the device prior to each exposure. It will be understood that the switches 3 and 13 may be constituted by suitable electronic elements, such as thyratrons which are made conductive by suitable electric pulses during the standardization intervals.

In the device described it is possible to vary the standard sensitivity thereof. Such variation may be necessary or desirable e.g. in order to adapt the device to the sensitivity of a photographic film to be exposed. As adjustment means the intensity of the reference light source as well as the voltage of the reference voltage source may be employed.

The diode 14, as stated before, protects the photomultiplier against overexposure. If the voltage drop across the anode resistor 15 increases to a value somewhat higher than 85 volts diode 14 becomes conductive and makes the control grid of tube 9 negative whereby the high tension supplied to the photomultiplier is sufficiently reduced.

The device is likewise suitable for measuring the ratio between two light fluxes. One of the light sources is used as a standardizer in the place of the light source 2 of the drawing. Irrespective of the power of the latter light source voltmeter 17 will produce a fixed deflection due to the fact that the sensitivity of the photomultiplier will adapt itself automatically to the intensity of the light source. At this deflection of the voltmeter the indication 100% can be applied. To measure the second light flux the switches 3 and 13 are opened. The sensitivity of the photomultiplier once acquired is maintained and the power of the second light source can be directly read on the voltmeter 17 as a percentage of that of the first light source.

What I claim is:
1. A light measuring device, comprising in combination, a photocell, means to control the sensitivity of said photocell, a reference light source of predetermined intensity adapted to irradiate said photocell during standardization intervals, a source of reference potential of predetermined value, comparing means to compare during such standardization intervals the output potential of said photocell with said reference potential, means to apply a control signal corresponding to a difference be- tween said output potential and said reference potential to said controlling means, and means to disconnect said controlling means from said signal applying means after said control signal has died away, whereby changes in the condition of said controlling means are excluded during measuring intervals between said standardization intervals.

2. A device as claimed in claim 1 wherein said reference light source has means to vary its intensity to thereby adjust the standard sensitivity.

3. A device as claimed in claim 1, wherein said source of reference potential has means to vary said reference potential to thereby adjust the standard sensitivity.

4. A light measuring device, comprising, in combination, a photomultiplier, a voltage supply circuit for said photomultiplier including a condenser as a source of reference voltage to stabilize the output voltage of said supply circuit, a reference light source of predetermined intensity adapted to irradiate said photomultiplier during standardization intervals, a source of reference potential of predetermined value, comparing means to compare during such standardization intervals the output potential of said photomultiplier with said reference potential, means to apply to said condenser a control potential in response to a difference between said output potential and said reference potential to thereby change said reference voltage to a point where said output potential and said reference potential are equal, and means to disconnect said condenser from said control potential applying means whereby said condenser maintains its charge during measuring intervals between said standardization intervals.

References Cited in the file of this patent

UNITED STATES PATENTS 2,583,143    Glick _____ Jan. 22, 1952